US010011243B2

(12) United States Patent
Patel et al.

(10) Patent No.: US 10,011,243 B2
(45) Date of Patent: Jul. 3, 2018

(54) PASSENGER AIRBAG HAVING HEAD ORIENTING EXTENSION AND DEPRESSION

(71) Applicant: Ford Global Technologies, LLC, Dearborn, MI (US)

(72) Inventors: Deepak Patel, Canton, MI (US); Srinivas Reddy Malapati, Novi, MI (US); Dinkar Sadashiv Karanth, Canton, MI (US); Srividya Mudumbi, Novi, MI (US); Zhibing Deng, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/010,406

(22) Filed: Jan. 29, 2016

(65) Prior Publication Data

US 2017/0217399 A1 Aug. 3, 2017

(51) Int. Cl.
*B60R 21/231* (2011.01)
*B60R 21/013* (2006.01)
(Continued)

(52) U.S. Cl.
CPC .......... *B60R 21/231* (2013.01); *B60R 21/013* (2013.01); *B60R 21/2334* (2013.01);
(Continued)

(58) Field of Classification Search
CPC combination set(s) only.
See application file for complete search history.

(56) References Cited

U.S. PATENT DOCUMENTS 5,219,179 A * 6/1993 Eyrainer ............... B60R 21/239
280/739
6,152,481 A * 11/2000 Webber ................. B60R 21/232
280/728.2
(Continued)

FOREIGN PATENT DOCUMENTS

DE 102014003234 A1 * 3/2015 ............. B60R 21/23
EP 1686017 A1 8/2006
(Continued)

OTHER PUBLICATIONS

UKIPO Search Report for Application No. GB1701366.5 dated Jul. 31, 2017 (4 pages).

*Primary Examiner* — Nicole T Verley
(74) *Attorney, Agent, or Firm* — Frank A. MacKenzie; Bejin Bieneman PLC

(57) ABSTRACT

An airbag system includes an airbag having a main portion having a first periphery. The main portion is inflatable in an inflation direction to a first thickness. An extension extends from the main portion and has a second periphery spaced from the first periphery. The extension is inflatable in the inflation direction to a second thickness. The first periphery and the second periphery define a gap therebetween. A depression is disposed between the main portion and the extension at the gap and the depression has a third thickness in the inflation direction less than the first thickness and the second thickness. The extension and the depression may receive a head of an occupant during an oblique impact, in which the head of the occupant may avoid the main portion of the airbag.

20 Claims, 11 Drawing Sheets

(51) Int. Cl.
  *B60R 21/2334* (2011.01)
  *B60R 21/2338* (2011.01)
  *B60R 21/00* (2006.01)
  *B60R 21/16* (2006.01)

(52) U.S. Cl.
  CPC .. *B60R 21/2338* (2013.01); *B60R 2021/0009* (2013.01); *B60R 2021/161* (2013.01)

(56) References Cited

U.S. PATENT DOCUMENTS

| | | | |
|---|---|---|---|
| 6,419,262 B1 * | 7/2002 | Fendt | B60R 21/231 280/729 |
| 6,962,363 B2 | 11/2005 | Wang et al. | |
| 7,798,520 B2 | 9/2010 | Feller et al. | |
| 8,500,165 B2 * | 8/2013 | Kwon | B60R 21/239 280/738 |
| 8,646,808 B2 * | 2/2014 | Williams | B60R 21/239 280/739 |
| 9,187,055 B1 * | 11/2015 | Genthikatti | B60R 21/2338 |
| 9,272,684 B1 * | 3/2016 | Keyser | B60R 21/237 |
| 9,340,176 B2 * | 5/2016 | Belwafa | B60R 21/233 |
| 9,358,945 B2 * | 6/2016 | Yamada | B60R 21/233 |
| 9,376,084 B2 * | 6/2016 | Choi | B60R 21/233 |
| 9,463,763 B2 * | 10/2016 | Watamori | B60R 21/23138 |
| 9,499,118 B2 * | 11/2016 | Jindal | B60R 21/231 |
| 9,505,372 B2 * | 11/2016 | Yamada | B60R 21/2338 |
| 9,533,652 B1 * | 1/2017 | Paxton | B60R 21/239 |
| 9,550,469 B2 * | 1/2017 | Sato | B60R 21/231 |
| 9,555,762 B2 * | 1/2017 | Umehara | B60R 21/233 |
| 9,561,774 B2 * | 2/2017 | Cheng | B60R 21/203 |
| 2002/0125692 A1 * | 9/2002 | Brannon | B60R 21/232 280/730.2 |
| 2003/0214121 A1 * | 11/2003 | Miyata | B60R 21/231 280/730.1 |
| 2003/0218325 A1 * | 11/2003 | Hasebe | B60R 21/233 280/743.2 |
| 2004/0145161 A1 * | 7/2004 | Hasebe | B60R 21/233 280/729 |
| 2005/0206143 A1 * | 9/2005 | Webber | B60R 21/2338 280/736 |
| 2006/0151228 A1 * | 7/2006 | Kalliske | B60R 21/2338 180/274 |
| 2006/0237953 A1 | 10/2006 | Abe | |
| 2007/0108745 A1 | 5/2007 | Belwafa et al. | |
| 2008/0048420 A1 * | 2/2008 | Washino | B60R 21/203 280/731 |
| 2008/0073893 A1 * | 3/2008 | Schneider | B60R 21/2338 280/740 |
| 2008/0122205 A1 * | 5/2008 | Imamura | B60R 21/203 280/730.1 |
| 2008/0203710 A1 * | 8/2008 | Kalliske | B60R 21/233 280/729 |
| 2009/0121462 A1 | 5/2009 | Ulrich | |
| 2010/0059972 A1 * | 3/2010 | Kim | B60R 21/0136 280/728.2 |
| 2010/0258958 A1 | 10/2010 | Wong | |
| 2011/0309605 A1 * | 12/2011 | Kumagai | B60R 21/2338 280/741 |
| 2012/0193897 A1 * | 8/2012 | Ruedisueli | B60R 21/21 280/730.2 |
| 2012/0223550 A1 * | 9/2012 | Mazanek | B60R 21/207 297/216.1 |
| 2012/0242069 A1 * | 9/2012 | Parks | B60R 21/2338 280/743.2 |
| 2013/0001934 A1 * | 1/2013 | Nagasawa | B60R 21/233 280/731 |
| 2013/0147171 A1 * | 6/2013 | Shin | B60R 21/2338 280/743.2 |
| 2013/0200603 A1 * | 8/2013 | Bergenheim | B60R 21/36 280/762 |
| 2013/0234422 A1 * | 9/2013 | Wipasuramonton | B60R 21/232 280/730.2 |
| 2014/0008902 A1 * | 1/2014 | Schneider | B60R 21/2338 280/741 |
| 2014/0035264 A1 | 2/2014 | Fukishima et al. | |
| 2014/0042732 A1 * | 2/2014 | Taguchi | B60R 21/233 280/729 |
| 2014/0333053 A1 * | 11/2014 | Thomas | B60R 21/2338 280/743.2 |
| 2015/0158452 A1 * | 6/2015 | Choi | B60R 21/233 280/732 |
| 2015/0166002 A1 * | 6/2015 | Fukawatase | B60R 21/233 280/730.1 |
| 2015/0258959 A1 * | 9/2015 | Belwafa | B60R 21/233 280/729 |
| 2015/0283971 A1 * | 10/2015 | Fischer | B60R 21/2338 280/742 |
| 2015/0298643 A1 * | 10/2015 | Schneider | B60R 21/233 280/729 |
| 2015/0307056 A1 * | 10/2015 | Cheng | B60R 21/231 280/729 |
| 2015/0321636 A1 * | 11/2015 | Jang | B60R 21/231 280/743.2 |
| 2015/0367802 A1 * | 12/2015 | Fukawatase | B60R 21/205 280/732 |
| 2016/0039385 A1 * | 2/2016 | Watamori | B60R 21/23138 280/730.1 |
| 2016/0046254 A1 * | 2/2016 | Yamada | B60R 21/233 280/729 |
| 2016/0046257 A1 * | 2/2016 | Yamada | B60R 21/2338 280/729 |
| 2016/0059817 A1 * | 3/2016 | Umehara | B60R 21/233 280/729 |
| 2016/0068131 A1 * | 3/2016 | Komatsu | B60R 21/233 280/730.1 |
| 2016/0096503 A1 * | 4/2016 | Lee | B60R 21/231 280/743.2 |
| 2016/0144820 A1 * | 5/2016 | Shin | B60R 21/239 280/735 |
| 2016/0159311 A1 * | 6/2016 | Yamada | B60R 21/233 280/729 |
| 2016/0159312 A1 * | 6/2016 | Sato | B60R 21/233 280/729 |
| 2016/0207490 A1 * | 7/2016 | Yamada | B60R 21/2338 |
| 2016/0311392 A1 * | 10/2016 | Jindal | B60R 21/231 |
| 2016/0339866 A1 * | 11/2016 | Pieruch | B60R 21/233 |
| 2016/0355152 A1 * | 12/2016 | Perez Garcia | B60R 21/233 |
| 2017/0015270 A1 * | 1/2017 | Ohno | B60R 21/233 |
| 2017/0021794 A1 * | 1/2017 | Sumiya | B60R 21/233 |
| 2017/0036639 A1 * | 2/2017 | Yamada | B60R 21/233 |
| 2017/0101071 A1 * | 4/2017 | Kruse | B60R 21/0136 |

FOREIGN PATENT DOCUMENTS

| | | |
|---|---|---|
| EP | 2839996 A1 | 2/2015 |
| JP | 3331883 | 7/2002 |
| JP | 5012725 B2 | 8/2012 |

\* cited by examiner

PASSENGER AIRBAG HAVING HEAD ORIENTING EXTENSION AND DEPRESSION

Government regulations, such as Annex 8 of the United Nations Economic Commission for Europe Regulation No. 16 (ECE16) and National Standard GB11522 of the People's Republic of China, may define conditions for testing forward displacement of an occupant toward a frontal airbag during a vehicle impact. For example, such regulations state that the head should not impact the instrument panel during the testing conditions. Therefore, there remains an opportunity to design an airbag system that satisfies these regulations for oblique impacts.

BACKGROUND

During a vehicle impact, a head of an occupant of the vehicle may displace toward an instrument panel, e.g., a center screen, console, etc. Frontal airbags may inflate to receive the head before the head impacts the instrument panel. However, during an oblique impact, the head of the occupant may be biased toward the center console.

DETAILED DESCRIPTION

Figure 1:
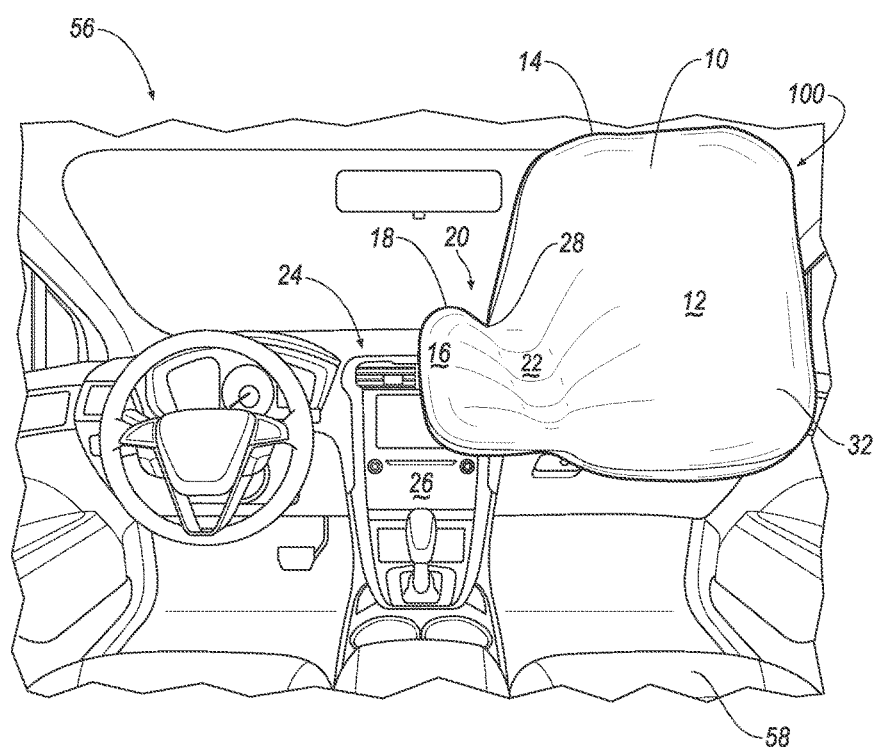
FIG. 1 is a perspective view of a vehicle including an airbag in an inflated position.

With reference to the Figures, wherein like numerals indicate like parts throughout the several views, an airbag system 100, 200, 300 for a vehicle 56 includes an airbag 10 having a main portion 12 having a first periphery 14. The main portion 12 is inflatable in an inflation direction I to a first thickness T1. An extension 16 extends from the main portion 12 and has a second periphery 18 spaced from the first periphery 14. The extension 16 is inflatable in the inflation direction I to a second thickness T2. The first periphery 14 and the second periphery 18 define a gap 20 therebetween. A depression 22 is disposed between the main portion 12 and the extension 16 at the gap 20 and the depression 22 has a third thickness T3 in the inflation direction I less than the first thickness T1 and the second thickness T2.

Figure 2A:
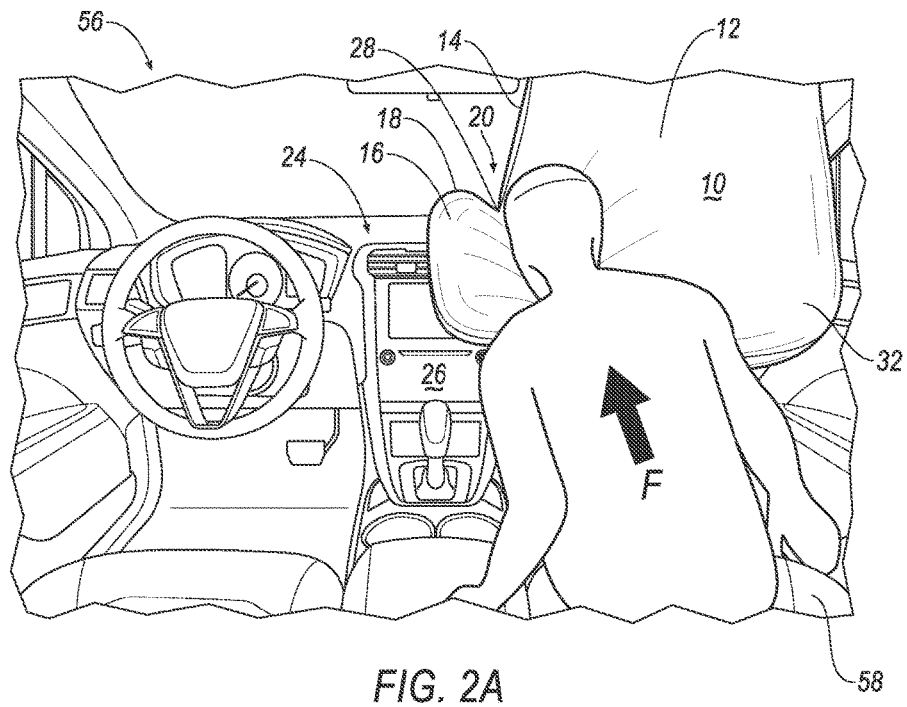
FIG. 2A is a perspective view of the airbag receiving a head of an occupant of the vehicle.
Figure 2B:
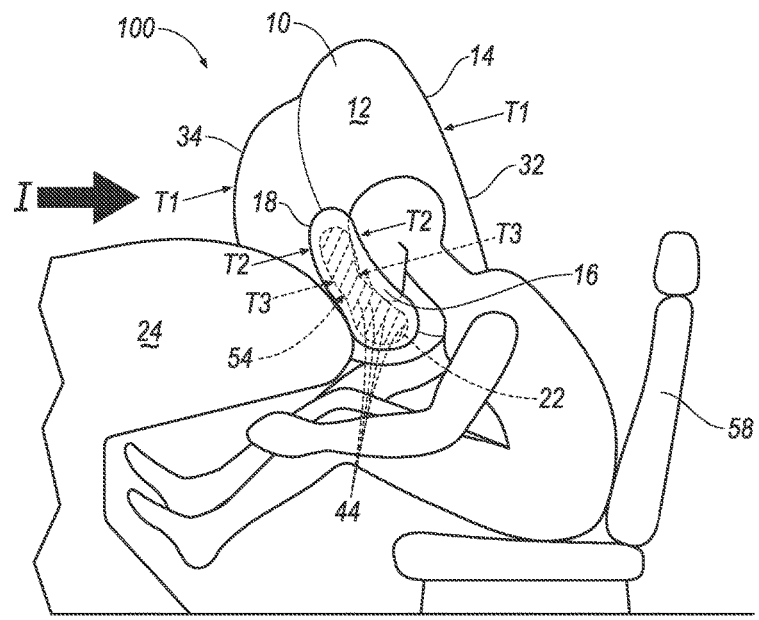
FIG. 2B is a cross-section of the airbag receiving the head of the occupant of the vehicle from a side of the airbag.

With reference to FIGS. 2A-B, during an impact of the vehicle 56, e.g., a front oblique impact, a front offset impact, etc., a passenger of the vehicle 56 may be moved angularly, i.e., forward and sideways. During such vehicle impacts, the head and/or chest of the passenger may slide along the main portion 12 toward and into the depression 22 of the inflated airbag 10. The depression 22 and the gap 20 between the main portion 12 and the extension 16 catches and retains the head and/or chest of the passenger to limit or prevent further sliding of the head and/or chest. As the head and/or chest engage the depression 22, the main portion 12, the extension 16, and the depression 22 may each slow and absorb energy from the head and/or chest. The depression 22 and the gap 20 may also limit or prevent further rotation of the head of the passenger when the head engages the depression 22 and the gap 20.

As shown in FIGS. 1-2B, the vehicle 56 may include an instrument panel 24. The instrument panel 24 may include a center console 26. The center console 26 may include controls and/or a display screen. The controls may, for example, be knobs and/or buttons for controlling a radio and sound system, climate control, etc. The display screen may display information and may receive input from a vehicle occupant. The display screen may be, for example, a liquid crystal display (LCD) touch screen. The center console 26 may also support additional feature such as climate control vents, storage compartments, gear selection levers, etc.

With continued reference to FIGS. 1-2B, the airbag system 100, 200, 300 is supported by the instrument panel 24. Specifically, the vehicle 56 may include a driver seat (not numbered) and a passenger seat 58, and the airbag 10 may be supported by the instrument panel 24 in front of the passenger seat 58 for absorbing impact from the passenger seated in the passenger seat 58 during an impact of the vehicle 56.

Figure 3:
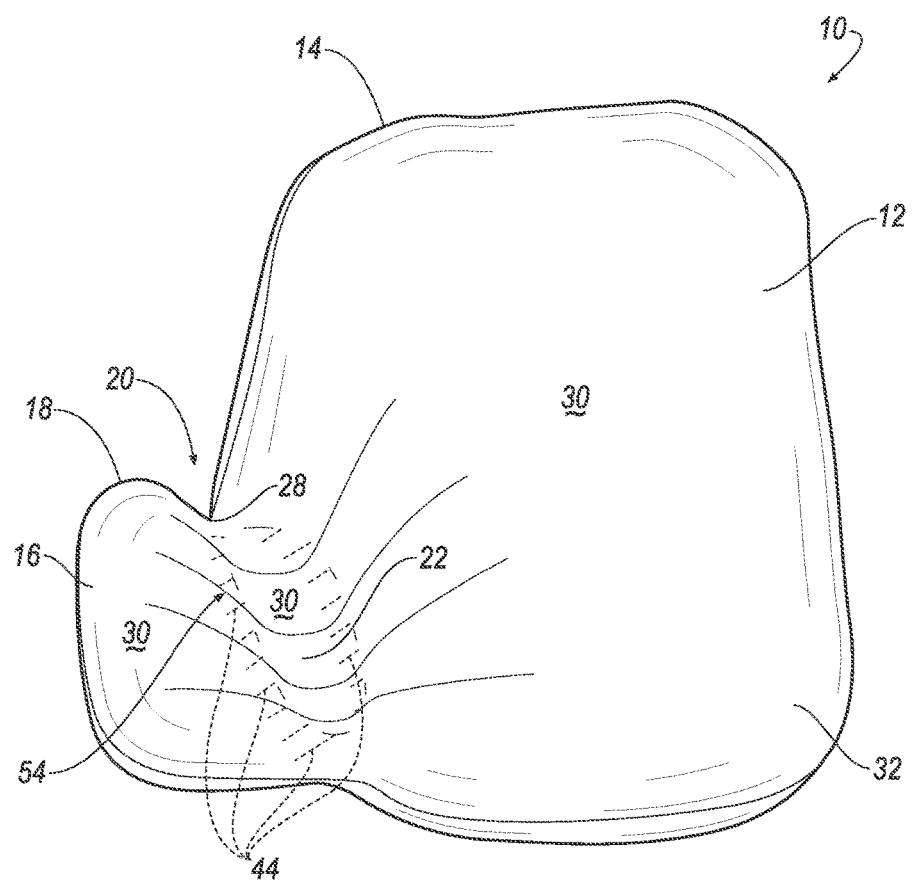
FIG. 3 is a perspective view of the airbag.
Figure 4:
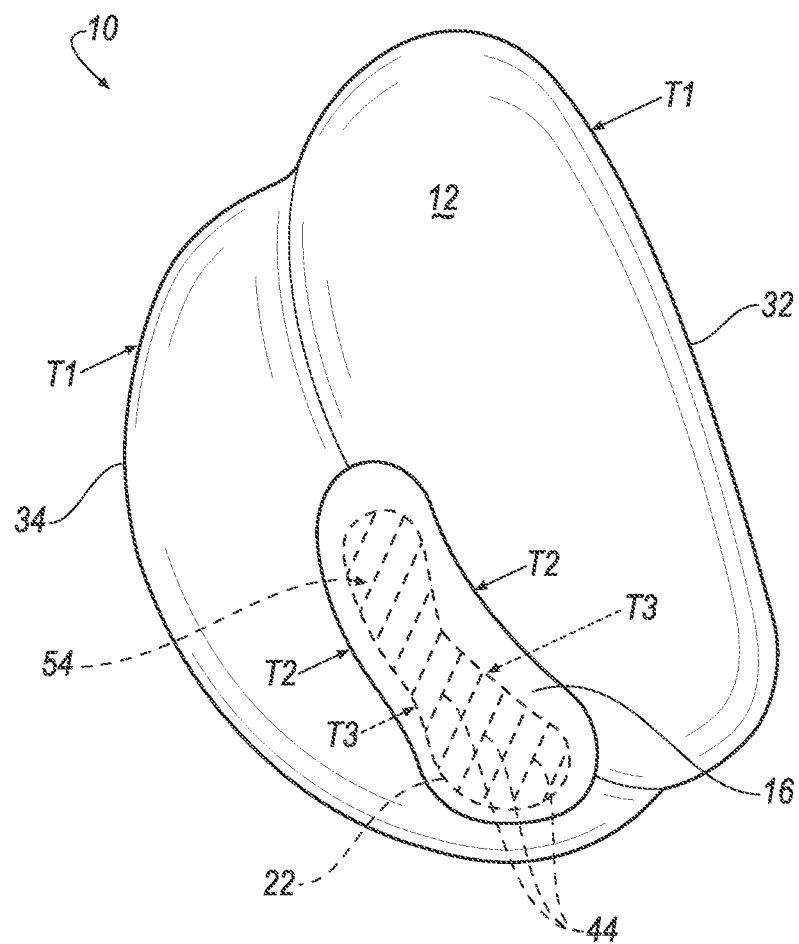
FIG. 4 is a side view of the airbag with tethers shown in hidden lines.
Figure 5A:
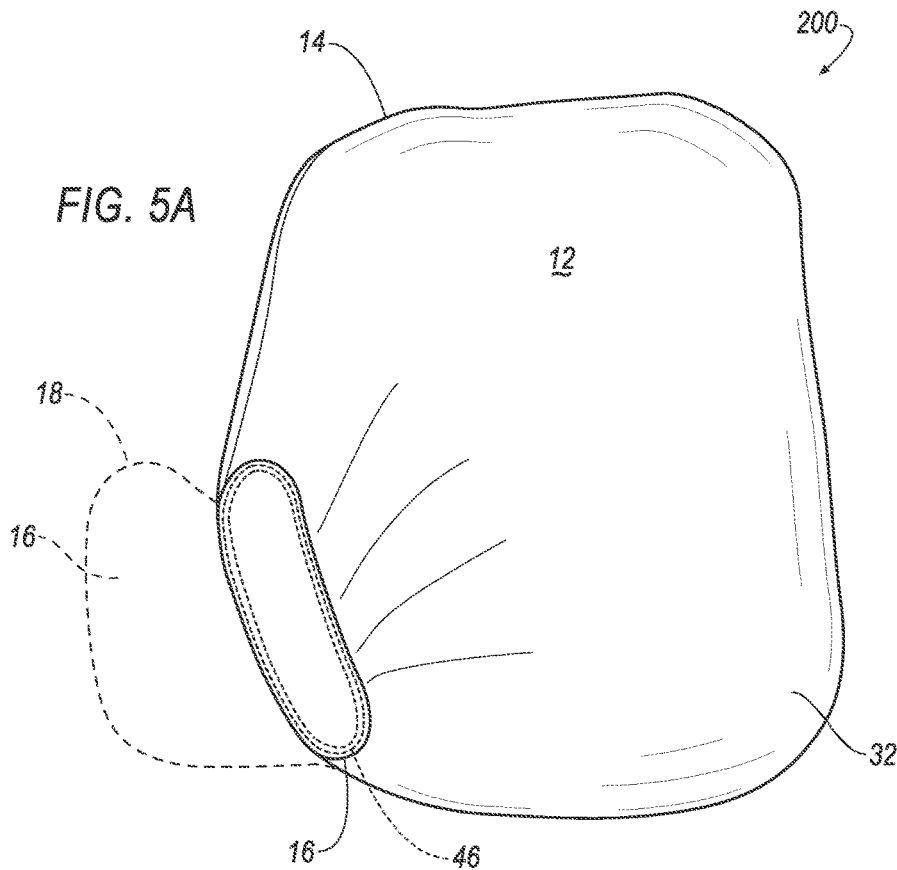
FIG. 5A is a perspective view of a second embodiment of the airbag in an inflated position.
Figure 5B:
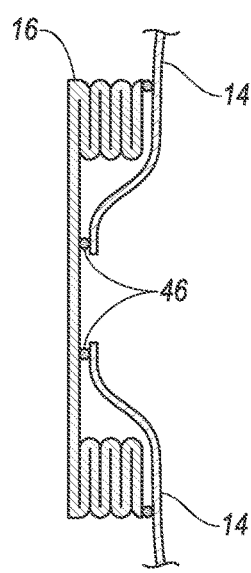
FIG. 5B is a cross-sectional view of a portion of the airbag of FIG. 4A showing an extension stitched to a main portion at a depression.

As set forth further below, a first embodiment of the airbag system 100 is shown in FIGS. 3-4, a second embodiment of the airbag system 200 is shown in FIGS. 5A-B, and a third embodiment of the airbag system 300 is shown in FIG. 6. Common numerals are used to identify common features in the various embodiments.

The airbag 10 is inflatable from an uninflated position (not shown), to an inflated position, shown in FIGS. 1-6. In the uninflated position, the airbag 10 may be concealed, e.g., behind a cover of the instrument panel 24. When inflated, the airbag 10 inflates in the inflation direction I to the inflated position.

As set forth above, the first periphery 14 of the main portion 12 is spaced from the second periphery 18 of the extension 16 in the inflated position. In other words, the extension 16 extends along the main portion 12 and is spaced from the main portion 12 by the gap 20. For example, as shown in the Figures, the extension 16 may be cantilevered from the main portion 12. As described further below and as illustrated in FIG. 1 and FIGS. 8-10, the extension 16 may extend from any suitable location on the main portion 12. The adjectives "first," "second," "third," etc., are used herein as identifiers and do not indicate order or importance.

As shown in the Figures, the first periphery 14 and the second periphery 18 may intersect at an intersection 28. The intersection 28 may be disposed at the depression 22. The gap 20 may be V-shaped. The gap 20 may be sized and shaped to receive at least a part of the head of the passenger. As set forth above, the gap 20 and the depression 22 catch the head to prevent the head from sliding across the airbag 10.

Figure 8:
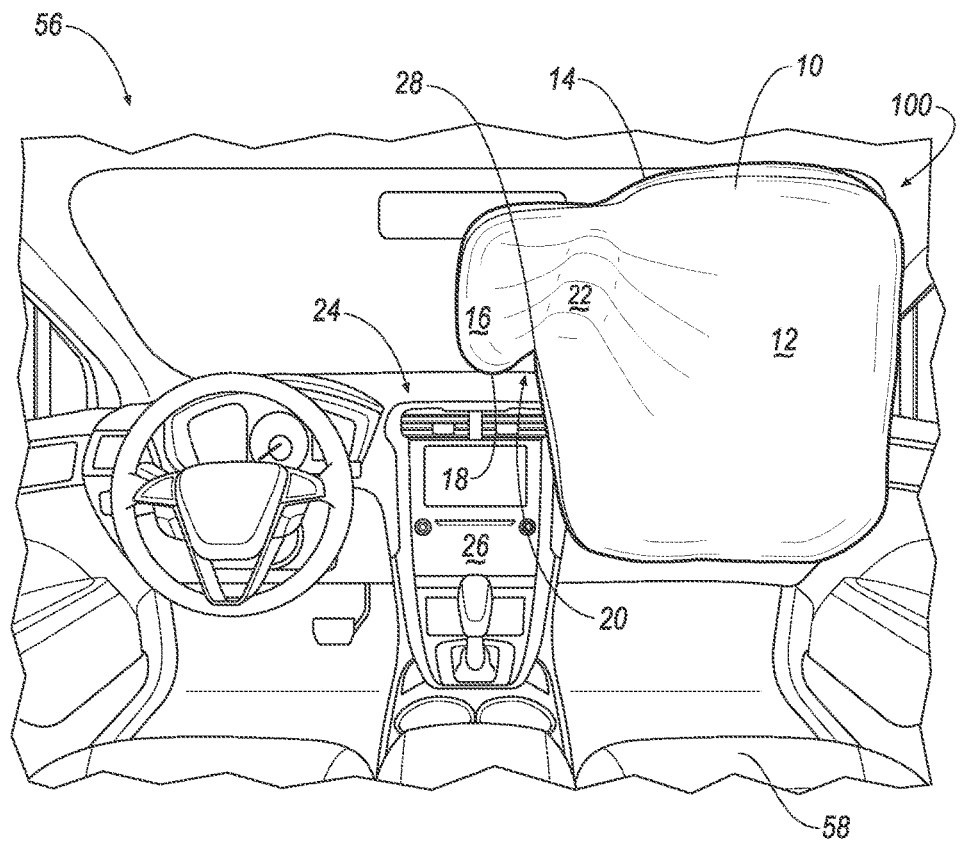
FIG. 8 is a perspective view of the vehicle with a second embodiment of the airbag including the extension in an upper left position.
Figure 9:
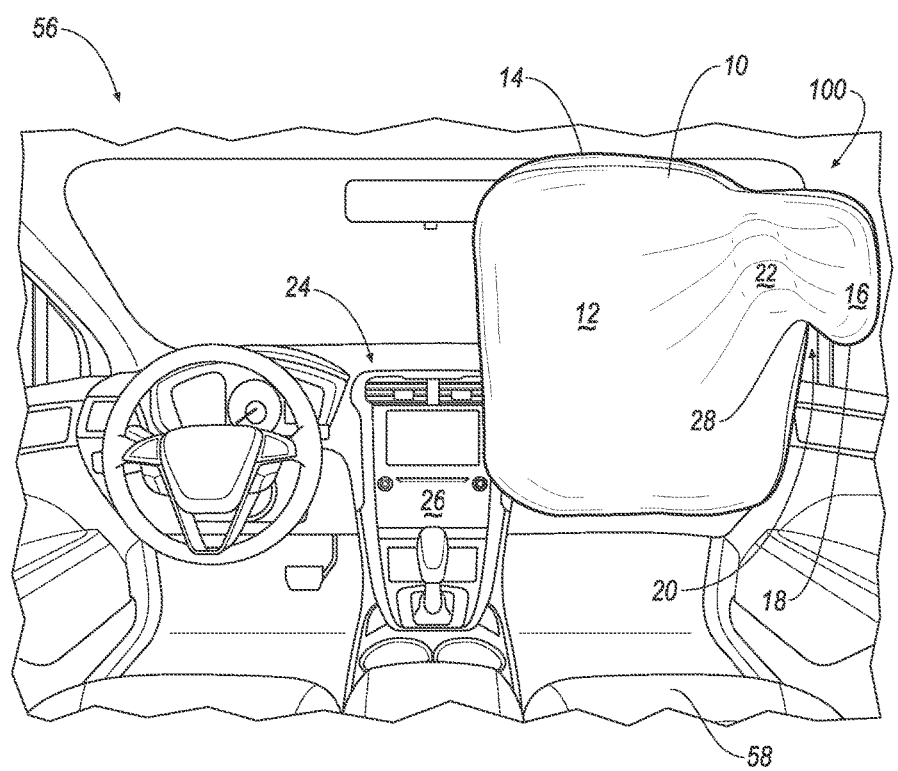
FIG. 9 is a perspective view of the vehicle with a third embodiment of the airbag including the extension in an upper right position.
Figure 10:
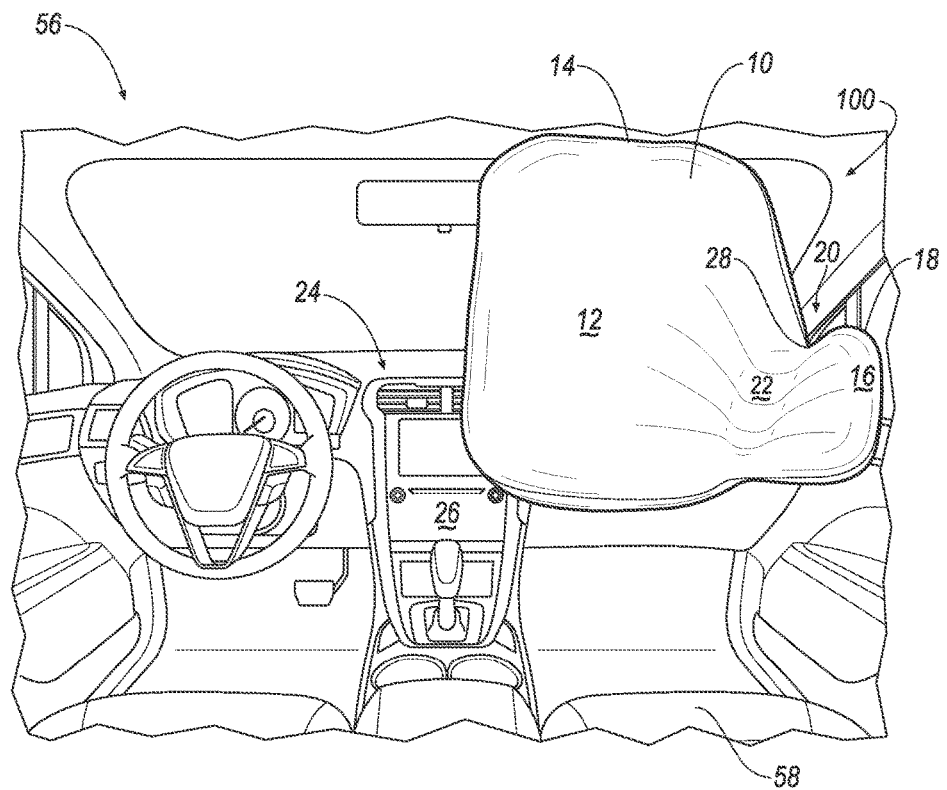
FIG. 10 is a perspective view of the vehicle with a fourth embodiment of the airbag including the extension in a lower right position.

As shown in FIGS. 1 and 8-10, the extension 16 may be disposed in a vehicle-left direction from the main portion 12 or in a vehicle-right direction from the main portion 12. The extension 16, for example, may extend in the vehicle-left direction from a lower section of the main portion 12, as shown in FIG. 1. In this configuration, the extension 16 may extend toward the center console 26. As another example, the extension 16 may extend in the vehicle-left direction from an upper section of the main portion 12, as shown in FIG. 8. In this configuration, the extension 16 may extend toward a rear-view mirror (not numbered) of the vehicle 56. As another example, the extension 16 may extend in a vehicle-right direction from an upper section of the main portion 12, as shown in FIG. 9. In this configuration, the extension 16 may extend toward an A-pillar (not shown) of the vehicle 56. As another example, the extension 16 may extend in the vehicle-right direction from a lower section of the main portion 12, as shown in FIG. 10. In this configuration, the extension 16 may extend toward a door, dash, and/or A-pillar of the vehicle 56. Alternatively, the extension 16 may extend from the main portion 12 at any location.

The airbag 10 defines an inflation chamber (not numbered). The inflation chamber may extend from the main portion 12, through the depression 22, to the extension 16. In other words, the inflation chamber may be continuous.

As set forth above, as shown in FIG. 2B, in the inflated position, the main portion 12 has a first thickness T1 in the inflation direction I, the extension 16 has a second thickness T2 in the inflation direction I, and the depression 22 has a third thickness T3 in the inflation direction I. As shown in the FIG. 2B, the inflation direction I is parallel to a longitudinal axis of the vehicle 56, i.e., a direction of travel of the vehicle 56. In other words, the airbag 10 inflates from the instrument panel 24 in the inflation direction I in a vehicle-rearward direction.

As set forth above, with continued reference to FIG. 2B, the third thickness T3 of the depression 22 is less than the first thickness T1 of the main portion 12 and the second thickness T2 of the extension 16. The second thickness T2 of the extension 16 may be less than the first thickness T1 of the main portion 12.

The depression 22 is concave relative to the main portion 12 and the extension 16. Specifically, the depression 22 extends from the main portion 12 and the extension 16 in a vehicle-forward direction. As such, the head of the passenger moves forward into the depression 22 during a vehicle impact that forces the passenger in a vehicle-forward direction.

The depression 22, the extension 16, and the main portion 12 may each present an impact surface 30, identified in FIG. 3, that is transverse to the inflation direction I. Specifically, the main portion 12 and the extension 16 may extend generally perpendicular to the inflation direction I, i.e., in a cross-vehicle direction, when the airbag 10 is inflated. The impact surface 30 of the main portion 12 may be larger than the impact surface 30 of the extension 16. At least a portion of the impact surface 30 of the extension 16 and the impact surface 30 of the main portion 12 each may slant toward the depression 22. The impact surface 30 of the depression 22 may be concave relative to the impact surface 30 of the main portion 12 and the impact surface 30 of the extension 16.

The impact surface 30 of the depression 22, the extension 16, and the main portion 12 may be integral with each other, i.e., formed simultaneously and of the same material. Alternatively, the impact surface 30 of each of the depression 22, the extension 16, and the main portion 12 may be formed separately and subsequently attached, e.g., by sewing.

With reference to FIG. 2B, the airbag 10 may include a front panel 32 and a back panel 34. When the airbag 10 is inflated the front panel 32 may face the passenger and the back panel 34 may face the instrument panel 24. The front panel 32 and the back panel 34 may be connected to each other in any suitable manner, e.g., by sewing. The front panel 32 and the back panel 34, in combination, may define the main portion 12, the extension 16, and the depression 22.

The airbag 10, i.e., the front panel 32 and the back panel 34, may be formed of any suitable type of material, e.g., from a woven polymer. For example, the airbag 10 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

Figure 7:
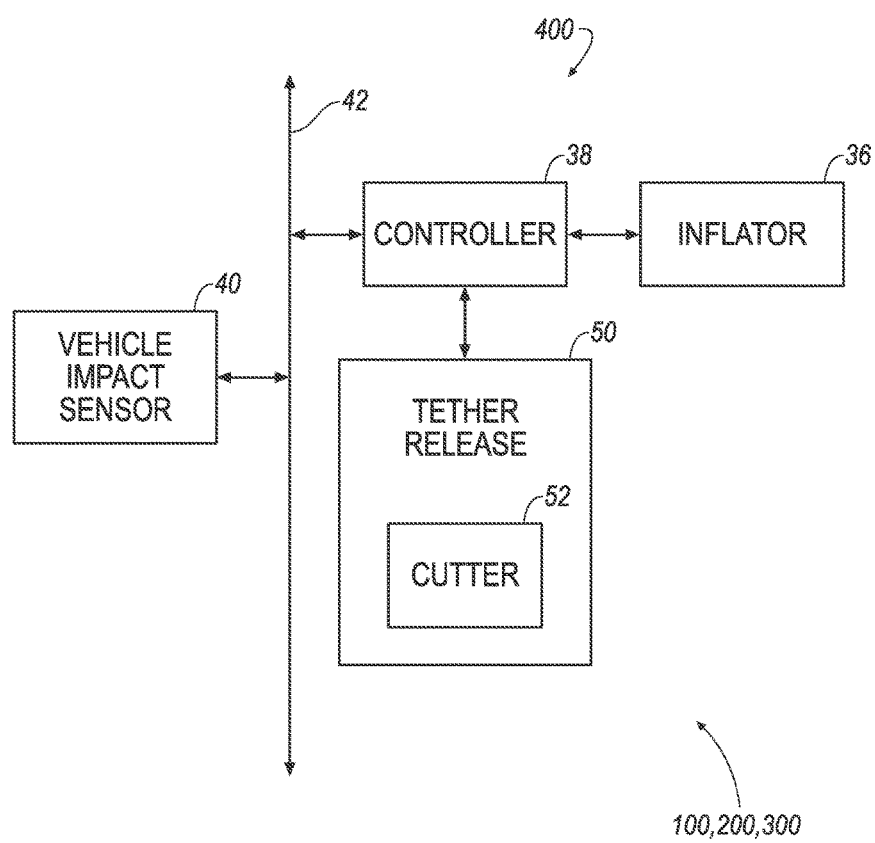
FIG. 7 is a schematic of a control system of the vehicle.

The airbag system 100, 200, 300 may include an inflator 36, shown schematically in FIG. 7, in fluid communication with the airbag 10. The inflator 36 may be disposed in the airbag 10 or may be remote to the airbag 10 and connected to the airbag 10 with a fill tub. The inflator 36 expands the airbag 10 with the inflation medium, such as a gas. The inflator 36 may be, for example, a pyrotechnic inflator that uses a chemical reaction to drive the inflation medium to the airbag 10. The inflator 36 may be of any suitable type, for example, a cold-gas inflator. The inflator 36 may be a dual stage inflator, i.e., designed to selectively inflate the airbag 10 to either a relatively lower pressure or a relatively higher pressure in response to instructions received by a controller 38, as described further below.

The airbag system 100, 200, 300 may include, or may be in communication with, a restraint control system 400, as shown in FIG. 7. The restraint control system 400 may include at least one sensor 40 for sensing impact of the vehicle 56. The airbag system 100, 200, 300 includes the controller 38 in communication with the sensor 40 and the inflator 36 for activating the inflator 36, e.g., for providing an impulse to a pyrotechnic charge of the inflator 36, when the sensor 40 senses an impact of the vehicle 56. Alternatively or additionally to sensing impact, the restraint control system 400 may be configured to sense impact prior to impact, i.e., pre-impact sensing. The sensor 40 may be of any suitable type, e.g., using radar, lidar, and/or a vision system. The vision system may include one or more cameras, CCD image sensors, and/or CMOS image sensor, etc.

The controller 38 may be a microprocessor-based controller. The sensor 40 is in communication with the controller 38 to communicate data to the controller 38. Based on the data communicated by the sensor 40, the controller 38 instructs the inflator 36 to activate.

The controller 38 and the sensor 40 may be connected to a communication bus 42, such as a controller area network (CAN) bus, of the vehicle 56. The controller 38 may use information from the communication bus 42 to control the activation of the inflator 36. The inflator 36 may be connected to the controller 38, as shown in FIG. 7, or may be connected directly to the communication bus 42.

The inflator 36 is activated when a vehicle impact is sensed by the vehicle impact sensor 40. The vehicle impact sensor 40 signals the controller 38, via the communication bus 42, to instruct the inflator 36 to inflate the airbag 10. When the extension 16 is inflated, the extension 16 and the main portion 12 retain the head of the occupant in the depression 22 as shown in FIGS. 2A-B. The depression 22 and the gap 20 orient the head in the airbag 10.

In the first embodiment of the airbag system 100, as shown in FIGS. 2-3, the extension 16 is in direct communication with the depression 22 and the main portion 12, and inflation of the extension 16 relative to the depression 22 and the main portion 12 is unrestricted. In other words, when the inflator 36 inflates the airbag 10, the main portion 12, the depression 22, and the extension 16 are substantially simultaneously inflated, i.e., inflation medium freely flows between the main portion 12, the depression 22, and the extension 16.

As best shown in FIGS. 2A-4, the airbag system 100, 200, 300 may include an inflation restraining device extending from the front panel 32 to the back panel 34 at the depression 22. The inflation restraining device 44 may restrict inflation of the airbag 10 at the depression 22 to the third thickness T3. The inflation restraining device 44 may be tunable, i.e., changeable, during construction of the airbag system 100, 200, 300 to modify the dimension of the third thickness T3.

Specifically, the inflation restraining device 44 may be a tether 44. For example, the inflation restraining device 44 may include several tethers 44 spaced from each other and each extending from the front panel 32 to the back panel 34 at the depression 22 to define the depression 22. The tethers 44 may be arranged in one or more rows. The tethers 44 may at least in part define a valley of the depression 22. However, the tethers 44 may be disposed in any suitable arrangement.

The tethers 44 may be of any suitable length and width, and the length and width of the tethers 44 may be tunable to modify the dimension of the third thickness T3. The tethers 44 may be formed of the same type of material as the front panel 32 and/or the back panel 34, or alternatively, may be formed of any suitable material.

Additionally or alternatively, to the tethers 44, the inflation restraining device 44 may be a seam (not shown) and/or an internal panel (not shown) that restricts inflation of the airbag 10 at the depression 22 to define the third thickness T3. However, the inflation restraining device 44 may be any suitable device for restricting the depression 22 to the third thickness T3.

Figure 6A:
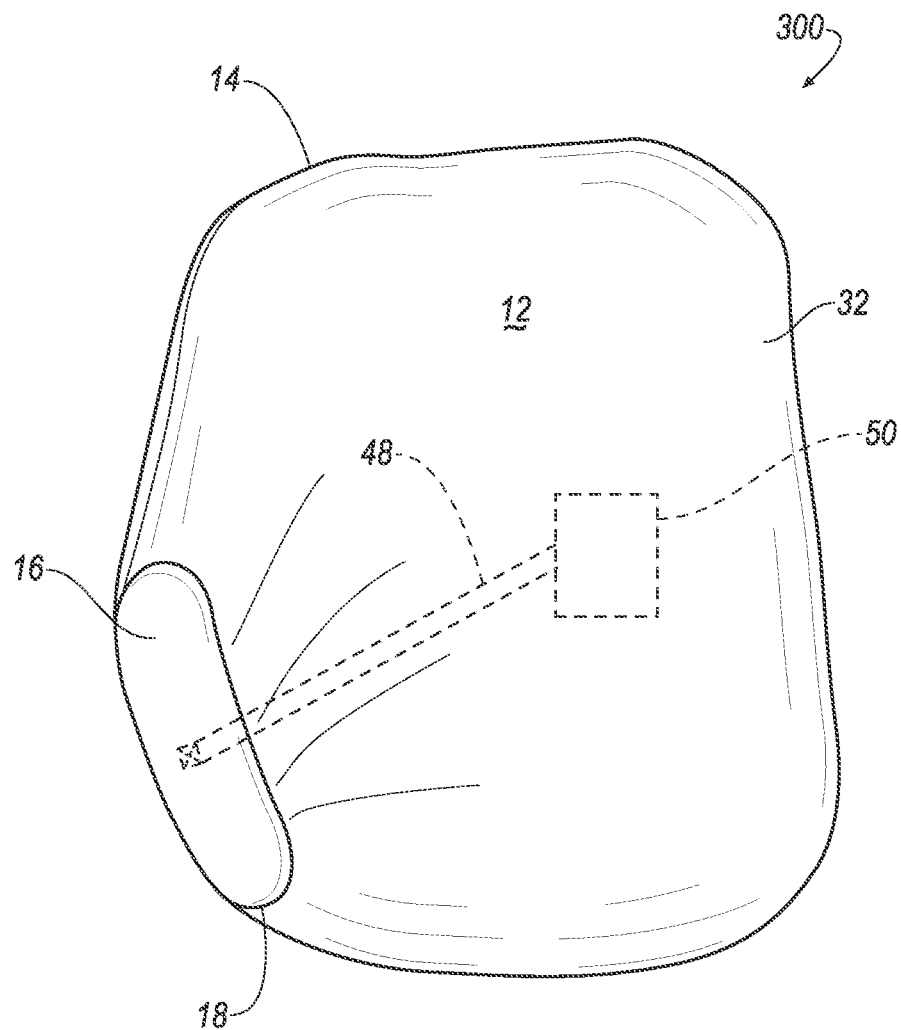
FIG. 6A is a perspective view of a third embodiment of the airbag with the main portion inflated and the extension uninflated.
Figure 6B:
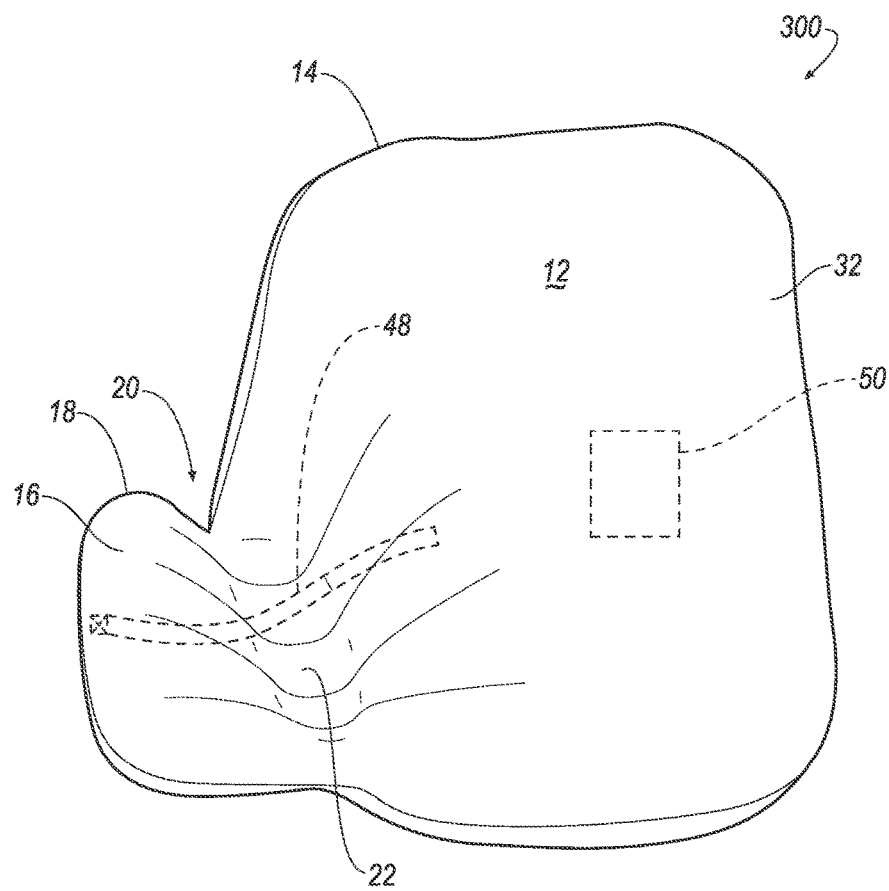
FIG. 6B is a perspective view of the airbag of FIG. 6A with the extension inflated.

The airbag system 200, 300 may be configured to selectively inflate the extension 16. Specifically, the airbag system 200, 300 of the second and third embodiments selectively inflate the extension 16. In other words, the airbag 10 may be selectively inflatable to a first inflation position, as shown in FIGS. 5A and 6A, in which the main portion 12 is inflated and the extension 16 uninflated, and may be selectively inflatable to a second inflation position, as shown in FIGS. 5B and 6B, in which the main portion 12 and the extension 16 are inflated. The selective inflation of the extension 16 may be in addition to the tethers 44 shown in the first embodiment, i.e., FIGS. 3 and 4.

With reference to the second embodiment of the airbag system 200 shown in FIGS. 5A-B, the airbag 10 may include a frangible connector 46 extending from the main portion 12 to the extension 16. The frangible connector 46 may be frangible relative to the extension 16, i.e., may break when the extension 16 is inflated above a designated pressure. For example, the frangible connector 46 may retain the extension 16 in the uninflated position, i.e., in the first inflation position of the airbag 10, when the airbag 10 is inflated to the relatively lower inflation pressure. The frangible connector 46 may break to release the extension 16 to the inflated position, as shown in broken lines in FIG. 5A, i.e., to the second inflation position of the airbag 10, when the airbag 10 is inflated to the relatively higher inflation position. The inflator 36 may be a dual stage inflator, as set forth above, to selectively apply the relative lower inflation pressure or the relatively higher inflation pressure.

The frangible connector 46 may be designed, i.e., sized, positioned, and formed of selected materials, to remain attached to the extension 16 and the main portion 12 in response to inflation of the main portion 12 to the relatively lower inflation pressure, and to break in response to inflation of the main portion 12 to the relatively higher inflation pressure. Since the frangible connector 46 is frangible relative to the extension 16, the frangible connector 46 releases from the main portion 12 when the main portion 12 is inflated to the relatively higher inflation pressure.

The frangible connector 46 may be a frangible stitch extending from the main portion 12 to the extension 16, as shown in FIGS. 5A-5B. Alternatively, the frangible connector 46 may be a frangible tether (not shown) extending from the main portion 12 to the extension 16.

With continued reference to the second embodiment of the airbag system 200, the controller 38 may be programmed to selectively inflate the extension 16. Specifically, the controller 38 may be programmed to inflate the extension 16 in response to a sensed oblique impact by the impact sensor 40. The controller 38 may be programmed to inflate the airbag 10 to the relatively higher inflation pressure in response to an oblique impact sensed by the impact sensor 40, and may be programmed to inflate the airbag 10 to the relatively lower inflation pressure in response to an impact other than an oblique impact sensed by the impact sensor 40. Said differently, the inflator 36 may be designed to receive a signal from the controller 38 to inflate the airbag 10 to the relatively high pressure in response to sensed oblique impact by the impact sensor 40, and may be designed to receive a signal from the controller 38 to inflate the airbag 10 to the relatively low pressure in response to an impact other than an oblique impact sensed by the impact sensor 40. In the alternative to sensed oblique impacts, the controller 38 may be programmed to inflate the extension 16/not inflate the extension 16 in response to any types of sensed impacts.

With reference to the third embodiment shown in FIGS. 6A-B, the airbag system 300 may include a tether 48 extending from the main portion 12 to the extension 16. The airbag system 300 may be configured to release the tether 48 in response to a sensed oblique vehicle impact, as shown in FIG. 6B, and to retain the tether 48 in response to a sensed impact other than an oblique impact, as shown in FIG. 6A.

For example, as shown in FIGS. 6A-7, the airbag system 300 may include a tether release 50 engaged with the tether 48. For example, the tether release 50 may support an end of the tether 48 and may selectively release the tether 48, e.g., in response to a sensed oblique impact. Specifically, for example, the tether release 50 may include a cutter 52 configured to cut the tether 48 in response to the sensed vehicle oblique impact.

With continued reference to FIGS. 6A-B, in the third embodiment, the controller 38 may be programmed to instruct the tether release 50 to release the tether 48 in response to a sensed vehicle oblique impact, e.g., when the impact sensor 40 senses a vehicle oblique impact. In other words, the tether release 50 may be designed to receive a signal from the controller 38 to release the tether 48 in response to a sensed oblique impact. In the absence of a sensed oblique impact, the controller 38 does not send a signal to the tether release 50 to release the tether 48. In the alternative to sensed oblique impacts, the controller 38 may be programmed to cut/not cut the tether 48 in response to any types of sensed impacts.

In the alternative to the cutter 52, the tether release 50 may be of any suitable type. For example, the tether 48 may be pinned to the tether release 50 and the tether release 50 may release the pin in response to a sensed oblique impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An airbag comprising:
a main portion having a first periphery and being inflatable in an inflation direction to a first thickness;
an extension being inflatable in the inflation direction to a second thickness, the extension having a second periphery spaced from the first periphery in a cross-vehicle direction and defining a gap therebetween;
a depression disposed between the main portion and the extension at the gap and having a third thickness in the inflation direction less than the first thickness and the second thickness, the depression including an impact surface extending downwardly from the gap and arcuately extending between the main portion and the extension in the cross-vehicle direction.

2. The airbag as set forth in claim 1, wherein the main portion includes an impact surface transverse to the inflation direction, the impact surface of the main portion being larger than the impact surface of the depression.

3. The airbag as set forth in claim 2, wherein the extension includes an impact surface transverse to the inflation direction, the impact surface of the main portion being larger than the impact surface of the extension.

4. The airbag as set forth in claim 1, wherein the gap is v-shaped.

5. The airbag as set forth in claim 1, further comprising a tether extending from the main portion to the extension, and a tether release engaged with the tether.

6. The airbag as set forth in claim 5, wherein the tether release includes a cutter configured to cut the tether in response to a sensed vehicle oblique impact.

7. The airbag as set forth in claim 1, further comprising a frangible connector extending from the main portion to the extension, the frangible connector being frangible relative to the extension.

8. The airbag as set forth in claim 1, wherein the extension is cantilevered from the main portion.

9. The airbag as set forth in claim 1, wherein the second thickness is less than the first thickness.

10. The airbag as set forth in claim 1, wherein the extension is smaller than the main portion.

11. The airbag as set forth in claim 1, further comprising an inflation chamber extending through the main portion, the depression, and the extension portion.

12. The airbag as set forth in claim 1, further comprising a front panel, a back panel, and a plurality of tethers spaced from each other and extending from the front panel to the back panel at the depression, the tethers restricting inflation of the airbag at the depression to the third thickness.

13. The airbag as set forth in claim 12, wherein the tethers are arranged in rows.

14. The airbag as set forth in claim 12, wherein the tethers at least in part define a valley of the depression.

15. An airbag system comprising:
a main portion having a first periphery and being inflatable in an inflation direction to a first thickness, the inflation direction extending in a vehicle-rearward direction;
an extension being inflatable in the inflation direction to a second thickness, the extension having a second periphery spaced from the first periphery in a cross-vehicle direction and defining a gap therebetween;
a depression disposed between the main portion and the extension at the gap and having a third thickness in the inflation direction less than the first thickness and the second thickness, the depression including an impact surface extending downwardly from the gap and arcuately extending between the main portion and the extension in the cross-vehicle direction;
a controller programmed to inflate the extension in response to a sensed vehicle oblique impact; and
a tether extending from the main portion to the extension, and a tether release engaged with the tether.

16. The airbag as set forth in claim 15, wherein the gap is v-shaped.

17. The airbag as set forth in claim 15, further comprising a restraining device at the depression.

18. The airbag system as set forth in claim 15, wherein the tether release includes a cutter configured to cut the tether in response to the sensed vehicle oblique impact.

19. The airbag system as set forth in claim 15, further comprising an inflator in fluid communication with the airbag.

20. The airbag system as set forth in claim 15, wherein the main portion and the extension meet at an intersection and extend upwardly from the intersection on opposite sides of the gap with the gap extending in the cross-vehicle direction from the main portion to the extension.

* * * * *